US012049065B2

(12) United States Patent
Sharma et al.

(10) Patent No.: US 12,049,065 B2
(45) Date of Patent: Jul. 30, 2024

(54) MULTILAYER FILMS AND LAMINATES CONTAINING SLIP AGENTS

(71) Applicant: Dow Global Technologies LLC, Midland, MI (US)

(72) Inventors: Rahul Sharma, Lake Jackson, TX (US); Jeffrey D. Weinhold, Lake Jackson, TX (US); Phillip D. Hustad, Lake Jackson, TX (US); Megan E. Donaldson, Midland, MI (US); Xiaoyong Li, Indianapolis, IN (US); Joseph C. Neuman, Midland, MI (US); Yang Yang, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 18/383,653

(22) Filed: Oct. 25, 2023

(65) Prior Publication Data

US 2024/0075720 A1   Mar. 7, 2024

Related U.S. Application Data

(63) Continuation of application No. 17/312,331, filed as application No. PCT/US2019/065480 on Dec. 10, 2019, now abandoned.

(60) Provisional application No. 62/779,913, filed on Dec. 14, 2018.

(51) Int. Cl.
| | |
|---|---|
| B32B 27/08 | (2006.01) |
| B32B 7/12 | (2006.01) |
| B32B 27/28 | (2006.01) |
| B32B 27/32 | (2006.01) |
| B32B 27/36 | (2006.01) |
| C08G 81/02 | (2006.01) |

(52) U.S. Cl.
CPC ............ *B32B 27/08* (2013.01); *B32B 7/12* (2013.01); *B32B 27/283* (2013.01); *B32B 27/32* (2013.01); *B32B 27/36* (2013.01); *C08G 81/024* (2013.01); *B32B 2250/24* (2013.01); *B32B 2270/00* (2013.01); *B32B 2307/31* (2013.01); *B32B 2307/518* (2013.01); *B32B 2307/746* (2013.01); *B32B 2439/70* (2013.01); *B32B 2553/00* (2013.01); *Y10T 428/31663* (2015.04)

(58) Field of Classification Search
CPC ......... B32B 27/08; B32B 7/12; B32B 27/283; B32B 27/32; B32B 27/36; B32B 2250/24; B32B 2270/00; B32B 2307/31; B32B 2307/518; B32B 2307/746; B32B 2439/70; B32B 2553/00; B32B 2250/02; B32B 2250/03; B32B 2250/04; B32B 2250/05; C08G 81/024; Y10T 428/31663; C08L 23/16

See application file for complete search history.

(56) References Cited

U.S. PATENT DOCUMENTS

| | | | |
|---|---|---|---|
| 5,602,609 | A | 2/1997 | Balling |
| 5,677,383 | A | 10/1997 | Chum et al. |
| 5,728,469 | A | 3/1998 | Mann et al. |
| 6,111,023 | A | 8/2000 | Chum et al. |
| 6,602,609 | B1 | 8/2003 | Kong |
| 6,984,695 | B2 | 1/2006 | Brown et al. |
| 2007/0298273 | A1 | 12/2007 | Thies et al. |
| 2015/0247007 | A1* | 9/2015 | Yang .................. C08G 77/442 525/106 |
| 2017/0114188 | A1 | 4/2017 | Habimana |

FOREIGN PATENT DOCUMENTS

| | | |
|---|---|---|
| WO | 2012/103080 A1 | 8/2012 |
| WO | 2018/226591 A1 | 6/2018 |
| WO | 2018/226620 A1 | 12/2018 |

OTHER PUBLICATIONS

M. Super et al., Macromolecules 1997, 30, 368-372.
Marlex 1017 Polyethylene: Superior Flexible Packaging Resins, Jun. 1, 2016.

* cited by examiner

*Primary Examiner* — Michael B Nelson
(74) *Attorney, Agent, or Firm* — Boyle Fredrickson, S.C.

(57) ABSTRACT

The present disclosure provides a multilayer film. The multilayer film includes at least two layers including a sealant layer and a second layer in contact with the sealant layer. The sealant layer contains (A) a first ethylene-based polymer having a density from 0.900 g/cc to 0.925 g/cc and a melt index from 0.5 g/10 min to 30 g/10 min; and (B) a polyethylene-polydimethylsiloxane block copolymer having a weight average molecular weight from 1,000 g/mol to 10,000 g/mol. The second layer contains a second ethylene-based polymer.

11 Claims, No Drawings

MULTILAYER FILMS AND LAMINATES CONTAINING SLIP AGENTS

BACKGROUND

The present disclosure relates to multilayer films and laminates having a sealant layer containing an ethylene-based composition including slip agents.

Film layers formed from ethylene-based polymers are used in multilayer films for a variety of applications, including, for example, food packaging and specialty packaging. An ethylene-based polymer outer film layer requires a low coefficient of friction (COF) (e.g., less than 0.20) for efficient processing of the films, such as in a fabrication line or a packaging line. To achieve a low COF, slip agents are typically added to the ethylene-based polymer outer layer, which may be a sealant layer. Conventional slip agents include unsaturated fatty acid amides such as erucamide and oleamide, which are known to lower a film's COF by migrating to the surface of the film. However, it is difficult to maintain a consistent low COF using conventional migratory slip agents under different environmental conditions, such as time, elevated temperature, elevated pressure, and various converting processes. Non-migratory slip agents such as silicones have also been added to the ethylene-based polymer outer layer, but they are known to generally be less effective at achieving a low COF (e.g., less than 0.20). Additionally, non-migratory slip agents are typically more expensive than migratory slip agents.

The art recognizes the need for a film that includes an ethylene-based polymeric layer that exhibits a low COF (e.g., less than 0.45) without a non-migratory slip agent. The art also recognizes the need for a laminate that includes an ethylene-based polymeric layer that exhibits a low COF (e.g., less than 0.45) without a non-migratory slip agent.

SUMMARY

The present disclosure provides a multilayer film. The multilayer film includes at least two layers including a sealant layer and a second layer in contact with the sealant layer. The sealant layer contains (A) a first ethylene-based polymer having a density from 0.900 g/cc to 0.925 g/cc and a melt index from 0.5 g/10 min to 30 g/10 min; and (B) a polyethylene-polydimethylsiloxane block copolymer having a weight average molecular weight from 1,000 g/mol to 10,000 g/mol. The second layer contains a second ethylene-based polymer.

The present disclosure also provides a laminate. The laminate includes a film containing a film containing a sealant layer, a substrate, and an adhesive layer adhering the film to the substrate. The sealant layer contains (A) a first ethylene-based polymer having a density from 0.900 g/cc to 0.925 g/cc and a melt index from 0.5 g/10 min to 30 g/10 min; and (B) a polyethylene-polydimethylsiloxane block copolymer having a weight average molecular weight from 1,000 g/mol to 10,000 g/mol.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "alkyl" (or "alkyl moiety"), as described herein, refers to an organic radical derived from an aliphatic hydrocarbon by deleting one hydrogen atom therefrom. An alkyl moiety may be linear, branched, cyclic or a combination thereof.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. In an embodiment, the ethylene-based polymer does not contain an aromatic comonomer polymerized therein.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$ -$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins, ELITE™ Enhanced Polyethylene Resins, and CONTINUUM™ Bimodal Polyethylene Resins, each available from The Dow Chemical Company; LUPOLEN™, available from LyondellBasell; and HDPE products from Borealis, Ineos, and ExxonMobil.

A "hydrocarbon" is a compound that contains only hydrogen and carbon atoms. The hydrocarbon can be (i) branched or unbranched, (ii) saturated or unsaturated, (iii) cyclic or acyclic, and (iv) any combination of (i)-(iii). Nonlimiting examples of hydrocarbons include alkanes, alkenes, and alkynes.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetra polymers, etc.

"Low density polyethylene" (or "LDPE") consists of ethylene homopolymer, or ethylene/α-olefin copolymer comprising at least one $C_3$-$C_{10}$ α-olefin, preferably $C_3$-$C_4$ that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLENT™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins and DOWLEX™ polyethylene resins, each available from the Dow Chemical Company; and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene and ELITE AT™ advanced technology resins, each available from The Dow Chemical Company; SURPASS™ Polyethylene (PE) Resins, available from Nova Chemicals; and SMART™, available from SK Chemicals Co.

An "olefin-based polymer" or "polyolefin" is a polymer that contains more than 50 weight percent polymerized olefin monomer (based on total amount of polymerizable monomers), and optionally, may contain at least one comonomer. Nonlimiting examples of an olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from I neos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ULDPE resins and FLEXOMER™ VLDPE resins, each available from The Dow Chemical Company.

TEST METHODS

Density is measured in accordance with ASTM D792, Method B. The result is recorded in grams per cubic centimeter (g/cc).

Haze is measured in accordance with ASTM D1003.

The "heat seal initiation temperature," or "HSIT" is the minimum sealing temperature required to form a heat seal of a significant strength, in this case, the temperature at which the average maximum seal force reaches 13.34 Newtons (N). HSIT is measured according to ASTM F88. Specimens are heat sealed across the machine direction (MD) on a Kopp™ Heat Sealer over a range of temperatures under the following conditions: Sealing Pressure=0.275 N/mm²; Sealing Dwell Time=0.5 seconds; Depth of Seal=5 mm. The sealed specimens are conditioned for a minimum of 3 hours at 23° C. (±2° C.) and 50% (±10%) relative humidity and cut into 2.54 cm (1 inch) wide strips. The cut specimens are conditioned for a minimum of 24 hours after sealing and cutting at 23° C. (±2° C.) and 50% (±10%) relative humidity prior to HSIT testing. The sealed specimen is tested in an INSTRON® Tensiomer at 10 in/min (4.2 mm/sec or 250 mm/min) at 23° C. (±2° C.) and 50% (±10%) relative humidity.

Melt index (MI) (I2) in g/10 min is measured using ASTM D-1238-04 (190° C./2.16 kg).

Coefficient of Friction

Coefficient of Friction (COF) is measured according to ASTM D1894. The substrate employed for COF determinations is stainless steel.

Multilayer film is produced as a roll. The "Pre-lamination COF" is measured after the film roll is stored for 1 week at ambient conditions (25° C., 101.325 kPa, 50-60% relative humidity).

"Laminate 60° C. Aged COF" is measured on a laminate structure after curing at ambient conditions (25° C., 101.325 kPa, 50-60% relative humidity) for 7 days, and then heating the laminate structure for 7 days at 60° C.

Square 3.5 inch×3.5 inch (8.89cm×8.89 cm) pieces are cut from each sample multilayer film roll and laminate structure for COF testing. Kinetic film-to-metal COF is measured on a TMI COF Tester, Model 32-06-00-0002, with standard testing conditions (23° C. (±2° C.) and 50% (±10%) relative humidity). A B-type sled is used, the sled being 2.5 inch×2.5 inch (6.35 cm×6.35 cm) and weighing 200 g. The square piece is placed on the bottom of the sled such that the side of interest is facing out, and with the MD parallel to the direction of movement. The square piece is attached to the sled on the forward and backward edges of the sled using double-sided tape, ensuring there are no wrinkles on the specimen. The sled is then placed specimen-face down on the testing frame and attached to a travel arm that contains a load cell (which measures frictional force). The sled is moved over the strip piece at a speed of 6 in/minute (15.24 cm/min) for a distance of 3 inches (7.62 cm). The average load over the 3 inches (7.62 cm) of movement is the kinetic force ($F_k$). The coefficient of kinetic friction ($\mu_k$) (COF) is the ratio of the kinetic force ($F_k$) to the normal force (W), wherein the normal force (W) is the weight of the sled (200 g). Five replicate samples are tested, and the average value is reported.

Polyethylene Block Crystallinity

Crystallinity of the polyethylene block of the polyethylene-polydimethylsiloxane block copolymer may be calculated in accordance with Equation (1):

$$\text{Crystallinity (wt \%)} = \begin{cases} 0.0136x^2 - 2.436x + 61.475, & \text{if } x < 30.39 \\ 0, & \text{if } x \geq 30.39 \end{cases} \quad \text{Equation (1)}$$

where x is the mole % of 1,2-butadiene in the polybutadiene block prior to hydrogenation, as measured by proton Nuclear Magnetic Resonance Spectroscopy ($^1$H NMR).

When the polyethylene block is made separately, crystallinity of the polyethylene block can be determined by measuring its density (d) and the mole% of α-olefin content (y) by $^{13}$C NMR according to the following Equation (2):

$$\text{Crystallinity (wt \%)} = \frac{(d - 0.853)}{0.147d(100 - z)} \times 10^4, \quad \text{Equation (2)}$$

$$\text{where } z = \frac{5600y}{(2800 + 28y)}.$$

GPC-Triple Detector

Weight average molecular weight (Mw) and number average molecular weight (Mn) of the polyethylene-polydimethylsiloxane block copolymer are measured by GPC (Viscotek™ GPC Max) using a triple detection capability. The Viscotek™ TDA305 unit is equipped with a differential refractometer, an online differential pressure viscometer, and low angle light scattering (LALS: 7° and 90° angles of detection). The mobile phase is Toluene HPLC grade. The columns are two PL Gel Mixed C from Varian—(7.5*300 mm, 5 µm particle size) and a PL Gel Guard column from Varian—(7.5*300 mm) 5 fractom Injection volume with a flow of 1 mL/min and a run time of 37 min. The column and detector temperature is 40° C. The software used is Omnisec 4.6.1 (Viscotek™).

The detectors are calibrated by injection of a narrow polystyrene standard (Mw 68,100 g/mol) of a known concentration. Correct run parameters are checked by using a narrow molecular weight distribution polystyrene standard (PS71K). The molecular weight averages must be within the Statistical Process Control (SPC) chart in order to validate the detectors calibration. Typical $GPC_3$ precision and accuracy (which depends on the refractive index increment) are around 2-3%.

DETAILED DESCRIPTION

The present disclosure provides a multilayer film. The multilayer film has at least two layers, including a sealant layer and a second layer in contact with the sealant layer. The sealant layer contains (A) a first ethylene-based polymer having a density from 0.900 g/cc to 0.925 g/cc and a melt index from 0.5 g/10 min to 30 g/10 min; and (B) a polyethylene-polydimethylsiloxane block copolymer having a weight average molecular weight from 1,000 g/mol to 10,000 g/mol. The second layer contains a second ethylene-based polymer.

The multilayer film contains two layers, or more than two layers. For example, the multilayer film can have two, three, four, five, six, seven, eight, nine, ten, eleven, or more layers. In an embodiment, the multilayer film contains only two layers, or only three layers.

1. Sealant Layer

The multilayer film contains a sealant layer. The sealant layer contains (A) a first ethylene-based polymer having a density from 0.900 g/cc to 0.925 g/cc and a melt index from 0.5 g/10 min to 30 g/10 min; (B) a polyethylene-polydimethylsiloxane block copolymer having a weight average molecular weight from 1,000 g/mol to 10,000 g/mol; and (C) optionally, an additive.

The sealant layer has two opposing surfaces. In an embodiment, the sealant layer is a continuous layer with two opposing surfaces.

A. First Ethylene-Based Polymer

The sealant layer contains a first ethylene-based polymer. The ethylene-based polymer has a density from 0.900 g/cc to 0.925 g/cc and a melt index from 0.5 g/10 min to 30 g/10 min. Nonlimiting examples of suitable ethylene-based polymer include LDPE and linear polyethylene. Nonlimiting examples of linear polyethylene include LLDPE, ULDPE, VLDPE, EPE, ethylene/α-olefin multi-block copolymers (also known as OBC), m-LLDPE, substantially linear, or linear, plastomers/elastomers (POP), and combinations thereof. Nonlimiting examples of suitable ethylene-based polymer also include ethylene/α-olefin interpolymer and ethylene/α-olefin copolymer. Nonlimiting examples of suitable α-olefins include $C_3$-$C_{20}$ α-olefins, or $C_4$-$C_{20}$ α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene. In an embodiment, the ethylene-based polymer is an ethylene/1-octene interpolymer.

In an embodiment, the ethylene-based polymer contains greater than 50 wt % units derived from ethylene, or from 51 wt %, or 55 wt %, or 60 wt % to 70 wt %, or 80 wt %, or 90 wt %, or 95 wt %, or 99 wt %, or 100 wt % units derived from ethylene; and a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt %, or 0 wt % units derived from an α-olefin comonomer, based on the weight of the ethylene-based polymer.

The ethylene-based polymer has a density from 0.900 g/cc, or 0.905 g/cc, or 0.910 g/cc, or 0.915 g/cc, or 0.920 g/cc to 0.925 g/cc. In an embodiment, the ethylene-based polymer has a density from 0.900 g/cc to 0.920 g/cc, or from 0.910 g/cc to 0.925 g/cc, or from 0.915 g/cc to 0.920 g/cc, or from 0.920 g/cc to 0.925 g/cc.

The ethylene-based polymer has a melt index from 0.5 g/10 min, or 1.0 g/10 min to 1.5 g/10 min, or 2.0 g/10 min, or 3.0 g/10 min, or 4.0 g/10 min, or 5.0 g/10 min, or 8.0 g/10 min, or 10 g/10 min, or 15 g/10 min, or 20 g/10 min, or 25 g/10 min, or 30 g/10 min. In an embodiment, the ethylene-based polymer has a melt index from 0.5 g/10 min to 20 g/10 min, or from 0.5 g/10 min to 10 g/10 min, or from 0.5 g/10 min to 5 g/10 min, or from 0.5 g/10 min to 2 g/10 min, or from 0.5 g/10 min to 1.0 g/10 min.

In an embodiment, the ethylene-based polymer is a LLDPE. The LLDPE is an ethylene homopolymer or an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer. In an embodiment, the LLDPE has density from 0.910 g/cc, or 0.915 g/cc, or 0.920 g/cc to 0.925 g/cc; and a melt index from 0.5 g/10 min, or 1.0 g/10 min to 1.5 g/10 min, or 2.0 g/10 min, or 3.0 g/10 min, or 4.0 g/10 min, or 5.0 g/10 min, or 8.0 g/10 min, or 10 g/10 min, or 15 g/10 min, or 20 g/10 min, or 25 g/10 min, or 30 g/10 min.

In an embodiment, the ethylene-based polymer is a LDPE. The LDPE is an ethylene homopolymer or an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer. In an embodiment, the LDPE has a density from 0.915 g/cc to 0.920 g/cc, or from 0.916 g/cc to 0.918 g/cc; and a melt index from 5 g/10 min to 20/10 min, or from 10 g/10 min to 20/10 min.

In an embodiment, the ethylene-based polymer is a POP. The POP is an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer. In an embodiment, the POP has density from 0.900 g/cc, or 0.902 g/cc to 0.904 g/cc, or 0.905, or 0.909 g/cc, or 0.910 g/cc, or 0.915, or 0.917 g/cc; and a melt index from 0.5 g/10 min, or 1.0 g/10 min to 1.5 g/10 min, or 2.0 g/10 min, or 3.0 g/10 min, or 4.0 g/10 min, or 5.0 g/10 min, or 8.0 g/10 min, or 10 g/10 min, or 15 g/10 min, or 20 g/10 min, or 25 g/10 min, or 30 g/10 min. In an embodiment, the ethylene-based polymer is a POP that is an ethylene/1-octene copolymer. In another embodiment, the POP that is an ethylene/1-octene copolymer has a density from 0.900 g/cc to 0.910 g/cc and a melt index from 0.5 g/10 min to 5 g/10 min.

The sealant layer may contain more than one ethylene-based polymer. In an embodiment, the sealant layer includes at least two ethylene-based polymers, wherein each ethylene-based polymer differs from one another compositionally, structurally, and/or physically. For example, the sealant layer may contain an LLDPE and a LDPE, or the sealant layer may contain a POP and LDPE.

In an embodiment, the sealant layer contains from 70 wt %, or 75 wt %, or 80 wt %, or 85 wt %, or 90 wt %, or 93 wt %, or 94 wt %, or 95 wt %, or 98 wt % to 99 wt %, or 99.5 wt %, or 99.7 wt %, or 99.99 wt % ethylene-based polymer, based on the total weight of the sealant layer. In another embodiment, the sealant layer contains from 94 wt %, or 95 wt %, or 98 wt % to 99.99 wt % ethylene-based polymer, based on the total weight of the sealant layer. In another embodiment, the sealant layer contains from 70 wt % to 99.99 wt %, or from 90 wt % to 99.99 wt %, or from 95 wt % to 99.99 wt %, or from 98 wt % to 99.99 wt %, ethylene-based polymer, based on the total weight of the sealant layer.

In an embodiment, the ethylene-based polymer is selected from POP, LLDPE, LDPE, and combinations thereof.

The ethylene-based polymer may comprise two or more embodiments disclosed herein.

B. Polyethylene-Polydimethylsiloxane Block Copolymer

The sealant layer contains a polyethylene-polydimethylsiloxane block copolymer having a weight average molecular weight from 1,000 g/mol to 10,000 g/mol.

A "polyethylene-polydimethylsiloxane block copolymer" (or PE-PDMS block copolymer) is a block copolymer having polyethylene (PE) blocks and polydimethylsiloxane (PDMS) blocks that are joined (covalently bonded) end-to-end with respect to polymerized functionality. The PE-PDMS block copolymer may be a PE-PDMS diblock copolymer, a PE-PDMS-PE triblock copolymer, a PDMS-PE-PDMS triblock copolymer, or a combination thereof.

In an embodiment, the PE-PDMS block copolymer has the following Structure (I):

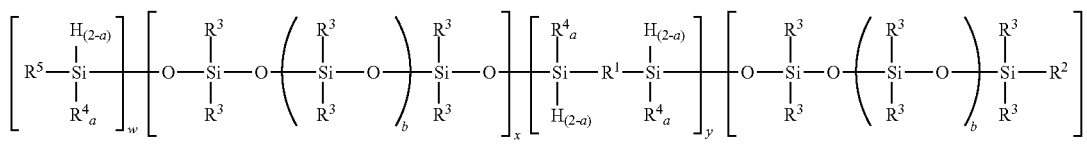

wherein a=1 or 2;
b=0-2000, or from 2-2000, or from 10-1000, or from 30-500;
w=0, 1, or 2, with the proviso that when w=0, z is a positive integer;
x=0 or a positive integer;
y=0 or a positive integer;
z=0-2, or 1-2, with the proviso that when z=0, w is a positive integer;
(w+y) is greater than, or equal to, 1;
(x+z) is greater than, or equal to, 1;

each $R^1$ is a divalent polyethylene block;

each $R^2$ is independently selected from $R^3$ and an alkoxysilyl functional hydrocarbylene-containing group;

each $R^3$ is independently selected from hydrogen and monovalent organic groups free of hydrolyzable functionality;

each $R^4$ is independently selected from monovalent hydrocarbyl groups; and each $R^5$ is a hydrogen-terminated polyethylene block.

Nonlimiting examples of suitable $R^2$ alkoxysilyl functional hydrocarbylene-containing groups include the following Structure (II), Structure (III), Structure (IV), Structure (V), and Structure (VI):

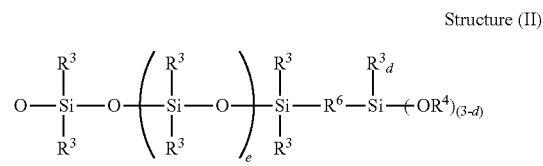

Structure (II)

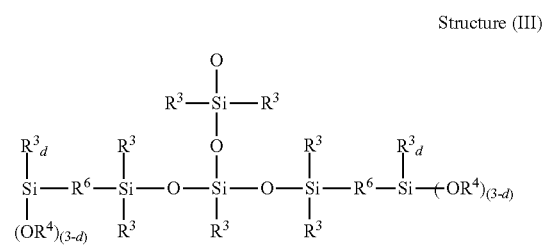

Structure (III)

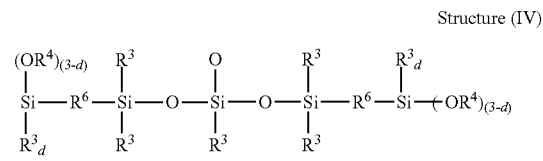

Structure (IV)

-continued

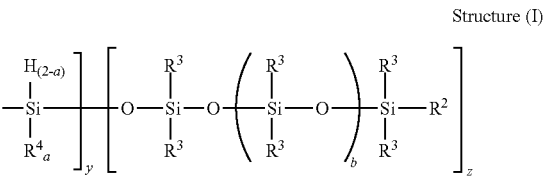

Structure (V)

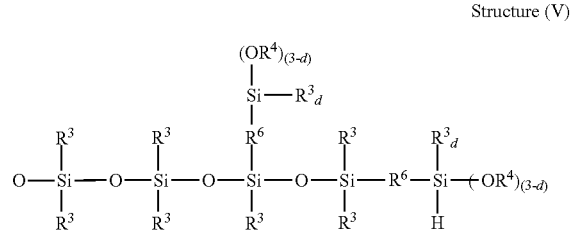

-continued

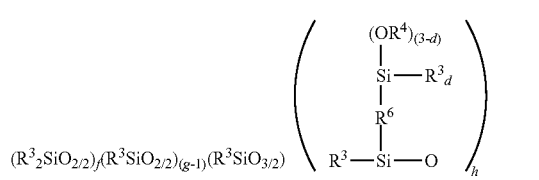

Structure (VI)

wherein d=0-2, or 1-2;
e=0-20, or 1-20;
f=0, or a positive integer;
g=1, or greater than 1;
h=1, or greater than 1;
with the proviso that (f+g+h) is equal to, or greater than 4;
with the proviso that (f+g+h) is equal to, or less than 50;
$R^3$ is independently selected from hydrogen and monovalent organic groups free of hydrolyzable functionality;
each $R^4$ is independently selected from monovalent hydrocarbyl groups; and
each $R^6$ is independently selected from divalent hydrocarbyl groups having from 2 to 18 carbon atoms.

In an embodiment, each $R^2$ is a $R^3$ group.

Nonlimiting examples of suitable $R^3$ monovalent organic groups free of hydrolyzable functionality include monovalent hydrocarbyl groups and monovalent halogenated hydrocarbyl groups. Nonlimiting examples of suitable monovalent hydrocarbyl groups include alkyl groups and aryl groups. Nonlimiting examples of suitable alkyl groups include methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl groups; and branched saturated monovalent hydrocarbyl groups of 6 or more carbon atoms including cycloalkyl groups such as cyclopentyl and cyclohexyl. Nonlimiting examples of suitable aryl groups include cyclopentadienyl, phenyl, tolyl, xylyl, anthracenyl, benzyl, 1-phenylethyl, 2-phenylethyl, and naphthyl groups. Monocyclic aryl groups may have from 5 to 9, or from 6 to 7, or from 5 to 6 carbon atoms. Polycyclic aryl groups may have from 10 to 17, or from 10 to 14, or from 12 to 14 carbon atoms. Nonlimiting examples of suitable monovalent halogenated hydrocarbon groups include chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Nonlimiting examples of other suitable monovalent organic groups include hydrocarbyl groups substituted with oxygen atoms, such as glycidoxyalkyl; and hydrocarbon groups substituted with nitrogen atoms, such as aminoalkyl; and cyano-functional groups, such as cyanoethyl and cyanopropyl. In an embodiment, each $R^3$ is independently selected from a monovalent hydrocarbyl group that is an alkyl group or an aryl group, or from methyl and phenyl.

Nonlimiting examples of suitable $R^4$ monovalent hydrocarbyl groups include alkyl groups, alkenyl groups, aryl groups, and combinations thereof. Nonlimiting examples of suitable alkyl groups include methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl groups; and branched saturated monovalent hydrocarbyl groups of 6 or more carbon atoms including cycloalkyl groups such as cyclopentyl and cyclohexyl. Nonlimiting examples of suitable alkenyl groups include vinyl, allyl, butenyl (including n-butenyl, iso-butenyl and t-butenyl), and hexenyl groups (including linear and branched isomers thereof). Nonlimiting examples of suitable aryl groups include cyclopentadienyl, phenyl, tolyl, xylyl, anthracenyl, benzyl, 1-phenylethyl, 2-phenylethyl, and naphthyl groups. Monocyclic aryl groups may have from 5 to 9, or from 6 to 7, or from 5 to 6 carbon atoms. Polycyclic aryl groups may have from 10 to 17, or from 10 to 14, or from 12 to 14 carbon atoms. In an embodiment, each $R^4$ is independently selected from alkyl groups and aryl groups, or from methyl and phenyl. In an embodiment, each $R^4$ of Structure (I) is independently selected from $C_1$-$C_{20}$, or $C_1$-$C_{12}$, or $C_1$-$C_8$, or $C_1$-$C_4$ monovalent hydrocarbyl groups. In another embodiment, each $R^4$ is methyl.

In an embodiment, the PE-PDMS block copolymer contains from 25 wt %, or 30 wt %, or 35 wt %, or 40 wt %, or 45 wt % to 50 wt %, or 55 wt %, or 60 wt %, or 65 wt %, or 70 wt %, or 75 wt % PDMS, based on the total weight of the PE-PDMS block copolymer. In another embodiment, the PE-PDMS block copolymer contains from 25 wt % to 75 wt %, or from 40 wt % to 60 wt %, or from 45 wt % to 55 wt %, or from 45 wt % to 50 wt % PDMS, based on the total weight of the PE-PDMS block copolymer.

In an embodiment, the PE-PDMS block copolymer contains from 25 wt %, or 30 wt %, or 35 wt %, or 40 wt %, or 45 wt % to 50 wt %, or 55 wt %, or 60 wt %, or 65 wt %, or 70 wt %, or 75 wt % PDMS; and a reciprocal amount of PE, or from 25 wt %, or 30 wt %, or 35 wt %, or 40 wt %, or 45 wt %, or 50 wt % to 55 wt %, or 60 wt %, or 65 wt %, or 70 wt %, or 75 wt % PE, based on the total weight of the PE-PDMS block copolymer.

In an embodiment, the PE-PDMS block copolymer contains from 25 wt %, or 30 wt %, or 35 wt %, or 40 wt %, or 45 wt %, or 50 wt % to 55 wt %, or 60 wt %, or 65 wt %, or 70 wt %, or 75 wt % PE, based on the total weight of the PE-PDMS block copolymer. In another embodiment, the PE-PDMS block copolymer contains from 25 wt % to 75 wt %, or from 40 wt % to 60 wt %, or from 45 wt % to 55 wt %, or from 45 wt % to 50 wt % PE, based on the total weight of the PE-PDMS block copolymer.

In an embodiment, the PE-PDMS block copolymer has a PE block with a crystallinity from 0%, or 1% to 3%, or 5%, or 10%, or 15%, or 20%, or 25%, or less than 30%. In another embodiment, the PE-PDMS block copolymer has a PE block with a crystallinity from 0% to less than 30%, or from 0% to 20%, or from 0% to 15%, or from 0% to 10%, or from 0% to 5%, or from 0% to 3%, or 0%. Not wishing to be bound by any particular theory, it is believed that a PE block with a low crystallinity of from 0% to less than 30% facilitates migration of the PE-PDMS block copolymer to a surface of the sealant layer, which in turn lowers the coefficient of friction (COF) of the sealant layer.

In an embodiment, the PE-PDMS block copolymer has a number average molecular weight (Mn) from 1000 g/mol, or 2000 g/mol to 6000 g/mol, or 10000 g/mol. In another embodiment, the PE-PDMS block copolymer has a Mn from 1000 g/mol to 10000 g/mol, or from 2000 g/mol to 6000 g/mol. Not wishing to be bound by any particular theory, it is believed that low Mn of from 1000 g/mol to 10,000 g/mol facilitates migration of the PE-PDMS block copolymer to a surface of the sealant layer, which in turn lowers the coefficient of friction (COF) of the sealant layer.

In an embodiment, the PE-PDMS has a weight average molecular weight (Mw) from 1000 g/mol, or 2000 g/mol, or 3000 g/mol, or 4000 g/mol to 5000 g/mol, or 6000 g/mol, or 10000 g/mol. In another embodiment, the PE-PDMS block copolymer has a Mw from 1000 g/mol to 10000 g/mol, or from 2000 g/mol to 6000 g/mol, or from 1000 g/mol to 5000 g/mol, or from 4000 g/mol to 5000 g/mol. Not wishing to be bound by any particular theory, it is believed that low Mw of from 1,000 g/mol to 10,000 g/mol facilitates migration of the PE-PDMS block copolymer to a surface of the sealant layer, which in turn lowers the coefficient of friction (COF) of the sealant layer.

In an embodiment, the PE-PDMS block copolymer contains, consists essentially of, or consists of: (A) from 25 wt %, or 30 wt %, or 35 wt %, or 40 wt %, or 45 wt %, or 50 wt % to 55 wt %, or 60 wt %, or 65 wt %, or 70 wt %, or 75 wt % PE, based on the total weight of the PE-PDMS block copolymer; (B) from 25 wt %, or 30 wt %, or 35 wt %, or 40 wt %, or 45 wt % to 50 wt %, or 55 wt %, or 60 wt %, or 65 wt %, or 70 wt %, or 75 wt % PDMS, based on the total weight of the PE-PDMS block copolymer; and the PE-PDMS block copolymer has one, some, or all, of the following properties: (i) PE block crystallinity from 0%, or 1% to 3%, or 5%, or 10%, or 15%, or 20%, or 25%, or less than 30%; and/or (ii) a Mn from 1000 g/mol, or 2000 g/mol to 6000 g/mol, or 10000 g/mol; and/or (iii) a Mw from 1000 g/mol, or 2000 g/mol, or 3000 g/mol, or 4000 g/mol to 5000 g/mol, or 6000 g/mol, or 10000 g/mol; and/or (iv) has the Structure (I).

The PE-PDMS block copolymer may be prepared as described in co-pending application numbers U.S. Ser. No. 62/644,838, filed 19 Mar. 2018; and U.S. Ser. No. 62/644,826, filed 19 Mar. 2018, the entire contents of which are herein incorporated by reference.

The sealant layer may contain more than one PE-PDMS block copolymers. In an embodiment, the sealant layer includes at least two PE-PDMS block copolymers, wherein each PE-PDMS block copolymer differs from one another compositionally, structurally, and/or physically.

In an embodiment, the sealant layer contains from 0.01 wt %, or 0.02 wt % to 0.1 wt %, or 0.5 wt %, or 1.0 wt %, or 1.5 wt %, or 2.0 wt % PE-PDMS block copolymer, based on the total weight of the sealant layer. In another embodiment, the sealant layer contains from 0.01 wt % to 2.0 wt %, or from 0.01 wt % to 1.0 wt %, or from 0.01 wt % to 0.5 wt %, or from 0.01 wt % to 0.10wt %, or from 0.01 wt % to 0.05 wt % PE-PDMS block copolymer, based on the total weight of the sealant layer.

The PE-PDMS block copolymer may comprise two or more embodiments disclosed herein.

C. Optional Additive(s)

In an embodiment, the sealant layer includes one or more optional additives. Nonlimiting examples of suitable additives include antiblock agents, fatty acid amides (e.g., erucamide, behenamide, and isooctadecanamide), antioxidants, antistatic agents, stabilizing agents, nucleating agents, colorants, pigments, ultra violet (UV) absorbers or stabilizers, flame retardants, compatibilizers, plasticizers, fillers, processing aids, antifog additive, crosslinking agents (e.g., peroxides), and combinations thereof.

In an embodiment, the sealant layer includes an antiblock agent. An "antiblock agent" is a compound that minimizes, or prevents, blocking (i.e., adhesion) between two adjacent layers of film by creating a microscopic roughening of the film layer surface, which reduces the available contact area between adjacent layers. The antiblock agent may be organic or inorganic. Nonlimiting examples of suitable antiblock agents include silica, talc, calcium carbonate, and combinations thereof.

In an embodiment, the antiblock agent is talc. In an embodiment, the sealant layer contains from 0 wt %, or 0.10 wt %, or 0.15 wt %, or 0.20 wt %, or 0.25 wt % to 0.3 wt %, or 0.4 wt %, or 0.5 wt %, or 1.0 wt %, or 1.5 wt %, or 2.0 wt % talc, based on the total weight of the sealant layer. In another embodiment, the sealant layer contains from 0.10 wt % to 2.0 wt %, or from 0.10 wt % to 1.0 wt %, or from 0.10 wt % to 0.5 wt %, or from 0.20 wt % to 0.40 wt % talc, based on the total weight of the sealant layer.

In an embodiment, the antiblock agent is silica ($SiO_2$). The silica may be organic silica or synthetic silica. In an embodiment, the antiblock agent is synthetic silica. In an embodiment, the sealant layer contains from 0 wt %, or 0.10 wt %, or 0.20 wt %, or 0.25 wt % to 0.3 wt %, or 0.4 wt %, or 0.5 wt %, or 1.0 wt %, or 1.5 wt %, or 2.0 wt % silica, based on the total weight of the sealant layer.

In an embodiment, the sealant layer contains from 0 wt %, or 0.01 wt %, or 0.05 wt %, or 0.1 wt % to 0.2 wt %, or 0.3 wt %, or 0.4 wt %, or 0.5 wt %, or 1.0 wt %, or 2.0 wt %, or 3.0 wt %, or 4.0 wt %, or 5.0 wt % additive, based on the total weight of the sealant layer.

The additive may comprise two or more embodiments disclosed herein.

In an embodiment, the sealant layer has a Pre-Lamination COF from 0.01, or 0.05, or 0.10 to 0.17, or 0.18, or 0.19, or 0.20, or 0.30, or 0.40, or 0.45. In another embodiment, the sealant layer has a Pre-Lamination COF from 0.01 to 0.45, or from 0.01 to less than 0.45.

In an embodiment, the sealant layer has a haze from 0%, or 1%, or 2%, or 3%, or 4% to 5%. In another embodiment, the sealant layer has a haze from 0% to 5%, or from 1% to 5%.

In an embodiment, the sealant layer has a heat seal initiation temperature (HSIT) of less than 100° C., or less than 90° C., or less than 85° C. In another embodiment, the sealant layer has a HSIT from 50° C., or 60° C., or 70° C. to 80° C., or 85° C., or 90° C., or 100° C. In another embodiment, the sealant layer has a HSIT from 50° C. to 90° C., or from 60° C. to 80° C., or from 70° C. to 80° C.

In an embodiment, the sealant layer has a thickness from 5 μm, or 8 μm, or 10 μm to 15 μm, or 20 μm, or 25 μm, or 30 μm, or 35 μm, or 40 μm, or 45 μm, or 50 μm, or 55 μm, or 60 μm, or 65 μm, or 70 μm, or 75 μm, or 80 μm, or 90 μm, or 100 μm, or 120 μm, or 150 μm.

The sealant layer may comprise two or more embodiments disclosed herein.

2. Second Layer

The multilayer film includes a second layer. The second layer contains a second ethylene-based polymer.

The second layer has two opposing surfaces. In an embodiment, the second layer is a continuous layer with two opposing surfaces.

The second layer is in contact with the sealant layer. The second layer may be in direct contact or in indirect contact with the sealant layer. In an embodiment, the second layer directly contacts the sealant layer. The term "directly contacts," as used herein, is a layer configuration whereby the second layer is located immediately adjacent to the sealant layer and no intervening layers, or no intervening structures, are present between the sealant layer and the second layer.

In another embodiment, the second layer indirectly contacts the sealant layer. The term "indirectly contacts," as used herein, is a layer configuration whereby an intervening layer, or an intervening structure, is present between the sealant layer and the second layer.

The second ethylene-based polymer may be any ethylene-based polymer disclosed herein. The second ethylene-based polymer may be the same or different than the ethylene-based polymer of the sealant layer. In an embodiment, the second ethylene-based polymer is the same as the ethylene-based polymer of the sealant layer. In another embodiment, the second ethylene-based polymer is different than the ethylene-based polymer of the sealant layer.

In an embodiment, the second ethylene-based polymer is a LLDPE, a LDPE, or a combination thereof. In a further embodiment, the LLDPE is an ethylene/1-octene copolymer. In an embodiment, the second layer contains from 5 wt %, or 10 wt %, or 20 wt %, or 30 wt %, or 40 wt %, or 50 wt %, or 60 wt %, or 70 wt %, or 80 wt % to 90 wt %, or 95 wt %, or 99 wt % LLDPE; and a reciprocal amount of LDPE, or from 1 wt %, or 5 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the second layer. In another embodiment, the second layer contains from 60 wt % to 90 wt %, or from 70 wt % to 80 wt % LLDPE, and from 10 wt % to 40 wt %, or from 20 wt % to 30 wt % LDPE, based on the total weight of the second layer.

In an embodiment, the second layer contains one or more optional additives. The additive may be any additive disclosed herein. In an embodiment, the second layer contains from 0 wt %, or 0.01 wt % to 0.5 wt %, or 1.0 wt %, or 3.0 wt %, or 5.0 wt % additive, based on the total weight of the second layer.

In an embodiment, the second layer has a thickness from 5 µm, or 8 µm, or 10 µm to 15 µm, or 20 µm, or 25 µm, or 30 µm, or 35 µm, or 40 µm, or 45 µm, or 50 µm, or 55 µm, or 60 µm, or 65 µm, or 70 µm, or 75 µm, or 80 µm, or 85 µm, or 90 µm, or 100 µm, or 120 µm, or 150 µm.

The second layer may be a substrate layer or a core layer. In an embodiment, the second layer is a core layer. A "core layer" is a layer of a film structure that is an inner layer. In other words, neither surface of a core layer is an outermost surface of the film. In another embodiment, the second layer is a substrate layer. A "substrate layer" is a layer of a film structure that may be an inner layer or a skin layer. A "skin layer" is an outermost layer of a film structure. In other words, at least one surface of a skin layer is an outermost surface of the film.

The second layer may comprise two or more embodiments disclosed herein.

3. Optional Third Layer

In an embodiment, the multilayer film includes an optional third layer. The third layer contains a third ethylene-based polymer.

The third layer has two opposing surfaces. In an embodiment, the third layer is a continuous layer with two opposing surfaces. The third layer is in contact with the second layer. The third layer may be in direct contact or in indirect contact with the second layer. In an embodiment, the third layer directly contacts the second layer. In another embodiment, the third layer indirectly contacts the second layer.

The third ethylene-based polymer may be any ethylene-based polymer disclosed herein. The third ethylene-based polymer may be the same or different than the first ethylene-based polymer of the sealant layer, and the third ethylene-based polymer may be the same or different than the second ethylene-based polymer of the second layer. In an embodiment, the third ethylene-based polymer is the same as the second ethylene-based polymer of the second layer. In another embodiment, the third ethylene-based polymer is different than the second ethylene-based polymer of the second layer.

In an embodiment, the third ethylene-based polymer is a LLDPE, a LDPE, or a combination thereof. In an embodiment, the third layer contains from 5 wt %, or 10 wt %, or 20 wt %, or 30 wt %, or 40 wt %, or 50 wt %, or 60 wt %, or 70 wt %, or 80 wt % to 90 wt %, or 99 wt % LLDPE; and a reciprocal amount of LDPE, or from 1 wt %, or 5 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the third layer. In another embodiment, the third layer contains from 60 wt % to 90 wt %, or from 70 wt % to 80 wt % LLDPE, and from 10 wt % to 40 wt %, or from 20 wt % to 30 wt % LDPE, based on the total weight of the third layer.

In an embodiment, the third layer contains one or more optional additives. The additive may be any additive disclosed herein. In an embodiment, the third layer contains from 0 wt %, or 0.01 wt % to 0.5 wt %, or 1.0 wt %, or 3.0 wt %, or 5.0 wt % additive, based on the total weight of the third layer.

In an embodiment, the third layer has a thickness from 5 µm, or 8 µm, or 10 µm to 15 µm, or 20 µm, or 25 µm, or 30 µm, or 35 µm, or 40 µm, or 45 µm, or 50 µm, or 55 µm, or 60 µm, or 65 µm, or 70 µm, or 75 µm, or 80 µm, or 85 µm, or 90 µm, or 100 µm, or 120 µm, or 150 µm.

The third layer may be a substrate layer or a core layer. In another embodiment, the third layer is a substrate layer.

The third layer may comprise two or more embodiments disclosed herein.

In an embodiment, the multilayer film has the following Structure (VII):

sealant layer/second layer    Structure (VII).

In an embodiment, the sealant layer and the third layer are skin layers on opposing sides of the second layer, which is a core layer. In a further embodiment, the sealant layer is in direct contact with the second layer, and the second layer is in direct contact with the third layer. In an embodiment, the multilayer film has the following Structure (VIII):

sealant layer/second layer/third layer    Structure (VIII).

In an embodiment, the multilayer film consists essentially of, or consists of, the sealant layer and the second layer. In another embodiment, the multilayer film consists essentially of, or consists of, the sealant layer, the second layer, and the third layer.

In an embodiment, the multilayer film has a thickness from 15 µm, or 20 µm, or 25 µm, or 30 µm, or 35 µm, or 40 µm, or 45 µm, or 50 µm to 55 µm, or 60 µm, or 65 µm, or 70 µm, or 75 µm, or 80 µm, or 85 µm, or 90 µm, or 95 µm, or 100 µm, or 150 µm, or 200 µm, or 250 µm, or 300 µm.

In an embodiment, the multilayer film contains, consists essentially of, or consists of:
(1) a sealant layer containing, consisting essentially of, or consisting of: (A) from 75 wt %, or 80 wt %, or 85 wt %, or 90 wt % to 93 wt %, or 94 wt %, or 95 wt %, or 98 wt %, or 99 wt %, or 99.5 wt %, or 99.99 wt % of the first ethylene-based polymer (e.g., POP, LLDPE, and/or LDPE), based on the total weight of the sealant layer, the first ethylene-based polymer having (i) a density from 0.900 g/cc, or 0.905 g/cc, or 0.910 g/cc, or 0.915 g/cc, or 0.920 g/cc to 0.925 g/cc; and (ii) a melt index from 0.5 g/10 min to 1.0 g/10 min, or 1.5 g/10 min, or 2.0 g/10 min, or 3.0 g/10 min, or 5.0 g/10 min, or 8.0 g/10 min, or 10.0 g/10 min, or 15 g/10 min, or 25 g/10 min, or 30 g/10 min; (B) from 0.01 wt %, or 0.02 wt % to 0.1 wt %, or 0.5 wt %, or 1.0 wt %, or 1.5 wt %, or 2.0 wt % PE-PDMS block copolymer, based on the total weight of the sealant layer, the PE-PDMS block copolymer having one, some, or all, of the following properties: (i) PE block crystallinity from 0%, or 1% to 5%, or 10%, or 15%, or 20%, or 25%, or less than 30%; and/or (ii) a Mn from 1000 g/mol, or 2000 g/mol to 6000 g/mol, or 10000 g/mol; and/or (iii) a Mw from 1000 g/mol, or 2000 g/mol to 6000 g/mol, or 10000 g/mol; and/or (iv) has the Structure (I); (C) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive (e.g., an antiblock agent), based on the total weight of the sealant layer; and (2) a second layer in contact with the sealant layer, the second layer containing a second ethylene-based polymer (e.g., LLDPE, LDPE, or a combination thereof);

(3) optionally, a third layer in contact with the second layer, the third layer containing a third ethylene-based polymer (e.g., LLDPE, LDPE, or a combination thereof); and the multilayer film has one, some, or all of the following properties: (i) the sealant layer has a thickness from 5 μm, or 8 μm, or 10 μm to 15 μm, or 20 μm, or 25 μm, or 30 μm, or 35 μm, or 40 μm, or 50 μm, or 60 μm, or 70 μm, or 80 μm, or 90 μm; and/or (ii) the sealant layer has a Pre-Lamination COF from 0.01, or 0.05, or 0.10 to 0.17, or 0.18, or 0.19, or 0.20, or 0.30, or 0.40, or 0.45; and/or (iii) the sealant layer has a haze from 0%, or 1%, or 2%, or 3%, or 4% to 5%; and/or (v) the sealant layer has a HSIT from 50° C., or 60° C., or 70° C. to 80° C., or 90° C., or 100° C.; and/or (vi) the second layer has a thickness from 5 μm, or 8 μm, or 10 μm to 15 μm, or 20 μm, or 25 μm, or 30 μm, or 35 μm, or 40 μm, or 50 μm, or 60 μm, or 70 μm, or 80 μm, or 90 μm; and/or (vii) the third layer has a thickness from 5 μm, or 8 μm, or 10 μm to 15 μm, or 20 μm, or 25 μm, or 30 μm, or 35 μm, or 40 μm, or 50 μm, or 60 μm, or 70 μm, or 80 μm, or 90 μm; and/or (viii) the multilayer film has a thickness of from 20 μm, or 30 μm, or 40 μm, or 50 μm to 55 μm, or 60 μm, or 70 μm, or 80 μm, or 90 μm, or 100 μm, or 150 μm, or 200 μm, or 250 μm.

It is understood that the sum of the components in each of the layers disclosed herein, including the foregoing layers, yields 100 weight percent (wt %), based on the total weight of each respective layer.

In an embodiment, the multilayer film excludes non-migratory slip agents, such as silicone.

Some methods, for example, used to construct films are by cast extrusion or blown extrusion methods. Combinations of these methods are also possible. In an embodiment, the multilayer film is a coextruded blown film.

The multilayer film may or may not be oriented. In an embodiment, the multilayer film is not an oriented film. In a further embodiment, the multilayer film is not biaxially oriented. In other words, the multilayer film is not stretched after extrusion. In another embodiment, the multilayer film is oriented (e.g., biaxially oriented).

In an embodiment, the multilayer film is included in a laminate. In such embodiments, an outermost surface of the sealant layer is an outermost surface of the laminate.

The multilayer film may comprise two or more embodiments disclosed herein.

Laminate

The present disclosure provides a laminate. The laminate includes a film containing a sealant layer, a substrate, and an adhesive layer adhering the film to the substrate. The sealant layer contains (A) a first ethylene-based polymer having a density from 0.900 g/cc to 0.925 g/cc and a melt index from 0.5 g/10 min to 30 g/10 min; (B) a PE-PDMS block copolymer; and (C) optionally, an additive.

The substrate is a second film. The laminate contains at least two films, or more than two films. For example, the laminate can have two, three, four, five, six, seven, eight, nine, ten, eleven, or more films. In an embodiment, the laminate contains only two films, or only three films.

The laminate includes the film, the adhesive layer in contact with the film, and a substrate in contact with the adhesive layer. In an embodiment, the laminate has the following Structure (IX):

film/adhesive layer/substrate             Structure (IX)

In an embodiment, the first film is a monolayer film containing a sealant layer and the substrate is a monolayer film, and the laminate has the following Structure (X):

sealant layer/adhesive layer/substrate             Structure (X).

In an embodiment, the laminate includes an optional third film laminated to the substrate. In a further embodiment, the laminate includes an optional second adhesive layer in contact with the substrate, and an optional third film in contact with the second adhesive layer. In an embodiment, the laminate has the following Structure (XI):

first film/adhesive layer/substrate/second adhesive layer/third film             Structure (XI).

1. Film

The laminate includes a film. The film includes a sealant layer.

The film has two opposing surfaces. The film may be a monolayer film or a multilayer film. In an embodiment, the film is a multilayer film containing at least two layers, or more than two layers. For example, the film can have two, three, four, five, six, seven, eight, nine, ten, or more layers. In an embodiment, the film contains only one layer, or only three layers.

In an embodiment, the film is a multilayer film including an optional core layer in contact with the sealant layer and an optional third substrate layer in contact with the core layer. In an embodiment, the outermost surface of the third substrate is laminated to an outermost surface of the second film.

A. Sealant Layer

The film contains a sealant layer. The sealant layer may be any sealant layer disclosed herein. In an embodiment, the sealant layer is a skin layer. In other words, an outermost surface of the sealant layer is an outermost surface of the film, and further an outermost surface of the laminate.

B. Optional Core Layer and Optional Third Substrate Layer

In an embodiment, the film is a multilayer film that includes a core layer and a third substrate layer.

The core layer has two opposing surfaces. In an embodiment, the core layer is a continuous layer with two opposing surfaces. The core layer is in contact with the sealant layer. The core layer may be in direct contact or in indirect contact with the sealant layer. In an embodiment, the core layer directly contacts the sealant layer. In another embodiment, the core layer indirectly contacts the sealant layer.

In an embodiment, the core layer contains a third ethylene-based polymer. The third ethylene-based polymer may be any ethylene-based polymer disclosed herein. The third ethylene-based polymer may be the same or different than the ethylene-based polymer of the sealant layer. In an embodiment, the third ethylene-based polymer is a LLDPE, a LDPE, or a combination thereof. In an embodiment, the core layer contains from 5 wt %, or 10 wt %, or 20 wt %, or 30 wt %, or 40 wt %, or 50 wt %, or 60 wt %, or 70 wt %, or 80 wt % to 90 wt %, or 95 wt %, or 99 wt % LLDPE; and a reciprocal amount of LDPE, or from 1 wt %, or 5 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the core layer. In another embodiment, the core layer contains from 60 wt % to 90 wt %, or from 70 wt % to 80 wt % LLDPE, and from 10 wt % to 40 wt %, or from 20 wt % to 30 wt % LDPE, based on the total weight of the core layer.

In an embodiment, the core layer contains one or more optional additives. The additive may be any additive disclosed herein. In an embodiment, the core layer contains from 0 wt %, or 0.01 wt % to 0.5 wt %, or 1.0 wt %, or 3.0 wt %, or 5.0 wt % additive, based on the total weight of the core layer. In an embodiment, the core layer contains an additive that is a slip agent selected from a fatty acid amide, a PE-PDMS block copolymer, and combinations thereof.

In an embodiment, the core layer has a thickness from 5 μm, or 8 μm, or 10 μm to 15 μm, or 20 μm, or 25 μm, or 30 μm, or 35 μm, or 40 μm, or 45 μm, or 50 μm, or 55 μm, or 60 μm, or 65 μm, or 70 μm, or 75 μm, or 80 μm, or 85 μm, or 90 μm, or 100 μm, or 120 μm, or 150 μm.

The third substrate layer has two opposing surfaces. In an embodiment, the third substrate layer is a continuous layer with two opposing surfaces. The third substrate layer is in contact with the core layer and the second film. The third substrate layer may be in direct contact or in indirect contact with the core layer. In an embodiment, the third substrate layer directly contacts the core layer. In another embodiment, the third substrate layer indirectly contacts the core layer. The third substrate layer may be in direct contact or in indirect contact with the second film. In an embodiment, the third substrate layer directly contacts the substrate. In another embodiment, the third substrate layer indirectly contacts the substrate.

In an embodiment, the third substrate layer contains a fourth ethylene-based polymer. The fourth ethylene-based polymer may be any ethylene-based polymer disclosed herein. The fourth ethylene-based polymer may be the same or different than the ethylene-based polymer of the sealant layer, and the fourth ethylene-based polymer may be the same or different than the third ethylene-based polymer of the core layer. In an embodiment, the fourth ethylene-based polymer is a LLDPE, a LDPE, or a combination thereof. In an embodiment, the third substrate layer contains from 5 wt %, or 10 wt %, or 20 wt %, or 30 wt %, or 40 wt %, or 50 wt %, or 60 wt %, or 70 wt %, or 80 wt % to 90 wt %, or 95 wt %, or 99 wt % LLDPE; and a reciprocal amount of LDPE, or from 1 wt %, or 5 wt %, or 10 wt %, or 20 wt % to 30 wt %, or 40 wt %, or 50 wt %, or 60 wt %, or 70 wt %, or 80 wt %, or 90 wt %, or 95 wt % LDPE, based on the total weight of the third substrate layer. In another embodiment, the third substrate layer contains from 60 wt % to 90 wt %, or from 70 wt % to 80 wt % LLDPE, and from 10 wt % to 40 wt %, or from 20 wt % to 30 wt % LDPE, based on the total weight of the third substrate layer.

In an embodiment, the third substrate layer contains one or more optional additives. The additive may be any additive disclosed herein. In an embodiment, the core layer contains from 0 wt %, or 0.01 wt % to 0.5 wt %, or 1.0 wt %, or 3.0 wt %, or 5.0 wt % additive, based on the total weight of the third substrate layer.

In an embodiment, the third substrate layer has a thickness from 5 μm, or 8 μm, or 10 μm to 15 μm, or 20 μm, or 25 μm, or 30 μm, or 35 μm, or 40 μm, or 45 μm, or 50 μm, or 55 μm, or 60 μm, or 65 μm, or 70 μm, or 75 μm, or 80 μm, or 85 μm, or 90 μm, or 100 μm, or 120 μm, or 150 μm.

In an embodiment, the third substrate layer is corona treated.

The core layer and the third substrate layer may comprise two or more embodiments disclosed herein.

The first film may comprise two or more embodiments disclosed herein.

2. Substrate

The laminate includes a substrate.

The substrate has two opposing surfaces. The substrate may be a monolayer film or a multilayer film. In an embodiment, the substrate is a monolayer film. In another embodiment, the substrate is a multilayer film containing at least two layers, or more than two layers. In an embodiment, the substrate contains only one layer, or only two layers, or only three layers.

In an embodiment, the substrate is a continuous layer with two opposing surfaces.

The substrate is in contact with the film. The substrate may be in direct contact or in indirect contact with the film. In an embodiment, the substrate directly contacts the film. In another embodiment, the substrate indirectly contacts the film.

The substrate is in contact with an adhesive layer. The substrate may be in direct contact or in indirect contact with the adhesive layer. In an embodiment, the substrate directly contacts the adhesive layer. In another embodiment, the substrate indirectly contacts the adhesive layer.

In an embodiment, the substrate contains a component selected from a second ethylene-based polymer, propylene-based polymer, polyamide (e.g., nylon), polyester, ethylene vinyl alcohol copolymer, polyethylene terephthalate (PET), ethylene vinyl acrylate copolymer, ethylene methyl acrylate copolymer, ethylene ethyl acrylate copolymer, ethylene butyl acrylate copolymer, ethylene acrylic acid copolymer, ethylene methacrylic acid copolymer, an ionomer of ethylene acrylic acid, an ionomer of methacylic acid, maleic anhydride grafted ethylene-based polymer, a polystyrene, a metal foil, and combinations thereof. In an embodiment, the substrate layer contains PET. In a further embodiment, the substrate contains biaxially oriented PET (BOPET). In another embodiment, the substrate contains a second ethylene-based polymer. The second ethylene-based polymer may be any ethylene-based polymer disclosed herein. The second ethylene-based polymer may be the same or different than the ethylene-based polymer of the sealant layer.

In an embodiment, the substrate has a thickness from 5 μm, or 8 μm, or 10 μm, or 12 μm, or 15 gm to 20 μm, or 25 km, or 30 μm, or 35 km, or 40 μm, or 45 km, or 50 μm, or 55 km, or 60 μm, or 65 μm, or 70 km, or 75 μm, or 80 km, or 85 km, or 90 km, or 100 μm, or 150 μm.

The substrate may comprise two or more embodiments disclosed herein.

3. Adhesive Layer

The laminate includes an adhesive layer. The adhesive layer adheres the film to the substrate.

The adhesive layer has two opposing surfaces. In an embodiment, the adhesive layer is a continuous layer with two opposing surfaces. The adhesive layer is in contact with the film. The adhesive layer may be in direct contact or in indirect contact with the film. In an embodiment, the adhesive layer directly contacts the film. In another embodiment, the adhesive layer indirectly contacts the film.

The adhesive layer contains an adhesive. Nonlimiting examples of suitable adhesives include polyurethane adhesives (e.g., MOR-FREE™ 705/C-79 and MOR-FREE™ 706A/C-79, each available from Rohm and Haas), polyacrylate adhesives (e.g., ROBOND™ L-168/CR3A, available from The Dow Chemical Company), and combinations thereof.

In an embodiment, the adhesive layer has a dry coating weight of from 0.5 grams per square meter (g/m$^2$), or 1.0 g/m$^2$, or 1.5 g/m$^2$, or 1.8 g/m$^2$ to 1.9 g/m$^2$, or 2.0 g/m$^2$, or 2.5 g/m$^2$, or 3.0 g/m$^2$.

The adhesive layer may comprise two or more embodiments disclosed herein.

4. Optional Third Film

In an embodiment, the laminate includes a third film. The third film is adhered to the substrate.

The third film has two opposing surfaces. The third film may be a monolayer film or a multilayer film. In an embodiment, the third film is a monolayer film. In another embodiment, the third film is a multilayer film containing at least two layers, or more than two layers. In an embodiment, the third film contains only one layer, or only two layers, or only three layers.

In an embodiment, the third film includes a second substrate. The second substrate may be any substrate disclosed herein.

The second substrate is in contact with the first substrate. The second substrate layer may be in direct contact or in indirect contact with the first substrate. In an embodiment, the second substrate layer directly contacts the first substrate. In another embodiment, the second substrate layer indirectly contacts the first substrate.

The second substrate may comprise two or more embodiments disclosed herein.

The third film may comprise two or more embodiments disclosed herein

5. Optional Second Adhesive Layer

In an embodiment, the laminate includes a second adhesive layer. The second adhesive layer adheres the third film to the substrate (i.e., the first substrate). The second adhesive layer may be any adhesive layer disclosed herein.

The second adhesive layer is in contact with the first substrate. The second adhesive layer may be in direct contact or in indirect contact with the first substrate. In an embodiment, the second adhesive layer directly contacts the first substrate. In another embodiment, the second adhesive layer indirectly contacts the first substrate. In an embodiment, the second adhesive layer is in contact with the optional third film. The second adhesive layer may be in direct contact or in indirect contact with the third film. In an embodiment, the second adhesive layer directly contacts the third film. In another embodiment, the second adhesive layer indirectly contacts the third film.

The second adhesive layer may comprise two or more embodiments disclosed herein

In an embodiment, the film is a multilayer film with a sealant layer, a core layer, and a skin layer; the substrate is a monolayer film; and the laminate has the following Structure (XII):

sealant layer/core layer/skin layer/adhesive layer/substrate          Structure (XII).

In an embodiment, the film is a multilayer film with a sealant layer, a core layer, and a skin layer; and the first substrate is a monolayer film; the third film is a monolayer film containing a second substrate; and the laminate has the following Structure (XIII):

sealant layer/core layer/skin layer/adhesive layer/first substrate/second adhesive layer/second substrate          Structure (XIII).

In an embodiment, the sealant layer of the laminate has a Pre-Lamination COF from 0.01, or 0.05, or 0.10 to 0.17, or 0.18, or 0.19, or 0.20, or 0.30, or 0.40, or 0.45. In another embodiment, the sealant layer of the laminate has a Pre-Lamination COF from 0.01 to 0.45, or from 0.01 to less than 0.45.

In an embodiment, the sealant layer of the laminate has a laminate COF after aging at 60° C. for 7 days (the "Laminate 60° C. Aged COF") from 0.01, or 0.05, or 0.10, or 0.20, or 0.40, or 0.50 to 0.65, or 0.70, or 0.75, or 0.80. In another embodiment, the sealant layer of the laminate has a Laminate 60° C. Aged COF from 0.01 to 0.80, or from 0.01 to less than 0.80, or from 0.01 to 0.70, or from 0.01 to 0.65.

In an embodiment, the sealant layer of the laminate has a ΔCOF from 0.01 to less than 0.2. In another embodiment, the sealant layer of the laminate has a ΔCOF from 0.01, or 0.05, or 0.10 to 0.14, or 0.15, or 0.16, or 0.17, or 0.18, or 0.19, or less than 0.2. In another embodiment, the sealant layer of the laminate has a ΔCOF from 0.01 to 0.19, or from 0.01 to 0.18. The "ΔCOF" is calculated in accordance with following Equation (A):

ΔCOF=Laminate 60° C. Aged COF−Prelamination COF          Equation (A)

In an embodiment, the sealant layer of the laminate has a haze from 0%, or 1%, or 2%, or 3%, or 4% to 5%. In another embodiment, the sealant layer of the laminate has a haze from 0% to 5%, or from 1% to 5%.

In an embodiment, the sealant layer of the laminate has a HSIT of less than 100° C., or less than 90° C., or less than 85° C. In another embodiment, the sealant layer of the laminate has a HSIT from 50° C., or 60° C., or 70° C. to 80° C., or 85° C., or 90° C., or 100° C. In another embodiment, the sealant layer of the laminate has a HSIT from 50° C. to 90° C., or from 60° C. to 80° C., or from 70° C. to 80° C.

In an embodiment, the laminate contains, consists essentially of, or consists of:

(1) a film containing (A) a sealant layer containing, consisting essentially of, or consisting of: (i) from 70 wt %, or 75 wt %, or 80 wt %, or 85 wt %, or 90 wt %, or 93 wt %, or 94 wt %, or 95 wt %, or 98 wt % to 99 wt %, or 99.5 wt %, or 99.7 wt %, or 99.99 wt % ethylene-based polymer (e.g., POP, LLDPE and/or LDPE), based on the total weight of the sealant layer, the ethylene-based polymer having (a) a density from 0.900 g/cc, or 0.905 g/cc, or 0.910 g/cc, or 0.915 g/cc, or 0.920 g/cc to 0.925 g/cc; and (b) a melt index from 0.5 g/10 min to 1.0 g/10 min, or 1.5 g/10 min, or 2.0 g/10 min, or 3.0 g/10 min, or 5.0 g/10 min, or 8.0 g/10 min, or 10.0 g/10 min, or 15 g/10 min, or 25 g/10 min, or 30 g/10 min; (ii) from 0.01 wt %, or 0.02 wt % to 0.1 wt %, or 0.5 wt %, or 1.0 wt %, or 1.5 wt %, or 2.0 wt % PE-PDMS block copolymer, based on the total weight of the sealant layer, the PE-PDMS block copolymer having one, some, or all of the following properties: (1) PE block crystallinity from 0%, or 1% to 3%, or 5%, or 10%, or 15%, or 20%, or 25%, or less than 30%; and/or (2) a Mn from 1000 g/mol, or 2000 g/mol to 6000 g/mol, or 10000 g/mol; and/or (3) a Mw from 1000 g/mol, or 2000 g/mol, or 4000 g/mol to 5000 g/mol, or 6000 g/mol, or 10000 g/mol; and/or (4) has the Structure (I); (iii) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive (e.g., an antiblock agent), based on the total weight of the sealant layer; and (B) optionally, a core layer in contact with the sealant layer, the core layer containing a third ethylene-based polymer (e.g., LLDPE and/or LDPE); (C) optionally, a third substrate layer in contact with the core layer, the third substrate layer containing a fourth ethylene-based polymer (e.g., LLDPE and/or LDPE);

(2) adhesive layer adhering the film to the substrate;

(3) the substrate in contact with the adhesive layer, the substrate containing a component selected from a second ethylene-based polymer, a propylene-based polymer, a polyamide (e.g., nylon), a polyester, PET (e.g., BOPET), a metal foil, and combinations thereof; and the laminate has one, some, or all of the following properties: (i) the sealant layer has a thickness from 5 μm, or 8 μm, or 10 μm to 15 μm, or 20 μm, or 25 μm, or 30 μm, or 35 μm, or 40 km, or 50 μm, or 60 μm, or 70 μm, or 80 μm, or 90 μm; and/or (ii) the sealant layer has a Pre-Lamination COF from 0.01, or 0.05, or 0.10 to 0.17, or 0.18, or 0.19, or 0.20, or 0.30, or 0.40, or 0.45; and/or (iii) the sealant layer has a Laminate 60° C. Aged COF from 0.01, or 0.05, or 0.10, or 0.20, or 0.40, or 0.50 to 0.65, or 0.70, or 0.75, or 0.80; and/or (vi) the sealant layer has a ΔCOF from 0.01, or 0.05, or 0.10 to 0.14, or 0.15, or 0.16, or 0.17, or 0.18, or 0.19, or less than 0.2; (v) the sealant layer has a haze from 0%, or 1%, or 2%, or 3%, or 4% to 5%; and/or (vi) the sealant layer has a HSIT from 50° C., or 60° C., or 70° C. to 80° C., or 85° C., or 90° C., or 100° C.; and/or (ix) the laminate has a thickness of from 15 μm, or 20 μm, or 30 μm, or 40 μm, or 45 μm, or 50 μm to 55 μm, or 60 μm, or 65 μm, or 70 μm, or 75 μm, or 80 μm, or 85 μm, or 90 μm, or 95 μm, or 100 μm, or 150 μm, or 200 μm, or 250 μm, or 300 μm.

In an embodiment, the sealant layer has (i) a ΔCOF from 0.01 to less than 0.20, or from 0.01 to 0.19, or from 0.01 to 0.18 and (ii) a haze from 0% to 5%, or from 1% to 5%. In a further embodiment, the sealant layer also has (iii) a HSIT from 50° C. to 90° C., or from 60° C. to 80° C., or from 70° C. to 80° C.

In an embodiment, the laminate excludes non-migratory slip agents, such as silicone.

The first film, the substrate, and the optional third film of the laminate may be a coextruded multilayer structure.

Some methods, for example, used to construct laminates are by adhesive lamination, extrusion lamination, thermal lamination, dry lamination, and solvent-less lamination. Combinations of these methods are also possible.

The first film, the substrate, and the optional third film of the laminate may or may not be oriented. In an embodiment, one or more, or each of the first film, the substrate, and the optional third film is not an oriented film. In another embodiment, one or more, or each of first film, the substrate, and the optional third film is oriented (e.g., biaxially oriented).

The laminate may comprise two or more embodiments disclosed herein.

The present disclosure also provides an article containing the multilayer film and/or the laminate, such as a package. Nonlimiting examples of suitable packages include food packages, specialty packages, and detergent packages (liquid and powder). In an embodiment, a package is provided, the package formed from two opposing laminates. In an embodiment, the sealant layer of the first laminate is in contact with the sealant layer of the second laminate. In a further embodiment, a heat seal is formed from the opposing sealant layers to produce a package.

By way of example, and not limitation, some embodiments of the present disclosure will now be described in detail in the following Examples.

EXAMPLES

Materials used in the examples are provided in Table 1A below.

TABLE 1A

| Material/Description | Properties | Source |
|---|---|---|
| DOWLEX ™ 2045G (LLDPE) (ethylene/1-octene copolymer) | MI (I2)(190° C./2.16 kg) = 1.0 g/10 min; Density = 0.920 g/cc | The Dow Chemical Company |
| DOWLEX ™ 2047G (LLDPE) (ethylene/α-olefin copolymer) | MI (I2)(190° C./2.16 kg) = 2.3 g/10 min; Density = 0.917 g/cc | The Dow Chemical Company |
| AFFINITY ™ 1880G (POP) (ethylene/α-olefin copolymer) | MI (I2)(190° C./2.16 kg) = 1.0 g/10 min; Density = 0.902 g/cc | The Dow Chemical Company |
| AFFINITY ™ 1881G (POP) (ethylene/α-olefin copolymer) | MI (I2)(190° C./2.16 kg) = 1.0 g/10 min; Density = 0.9035 g/cc Contains 7500 ppm fatty acid amide, 2500 ppm inorganic antiblock, and 7.175 wt % DOWLEX ™ Carrier Resin | The Dow Chemical Company |
| AGILITY ™ 1001 Performance LDPE (LDPE) | MI (I2)(190° C./2.16 kg) = 0.65 g/10 min; Density = 0.920 g/cc | The Dow Chemical Company |
| Talc Concentrate | 50 wt % talc dispersed in DOWLEX ™ 2047G | The Dow Chemical Company |
| MB25-502 Masterbatch | 25 wt % PDMS dispersed in LDPE A LDPE A MI (I2)(190° C./2.16 kg) = 8.0 g/10 min | Dow Corning |
| MB25-035 Masterbatch | 25 wt % PDMS dispersed in LDPE B | Dow Corning |
| ME 50024 Masterbatch | 64 wt % talc dispersed in LDPE C LDPE C MI (I2)(190° C./2.16 kg) = 20 g/10 min | Dow Corning |
| polyethylene-polydimethylsiloxane diblock copolymer A (PE-PDMS Diblock A) | 40.0 wt % PDMS[1]; 60.0 wt % polyethylene[1]; 1,2-butadiene mole % in the polybutadiene block prior to hydrogenation = 37.0 mol % Mw = 12,950 g/mol; polyethylene block crystallinity = 0% | Prepared as described below |
| polyethylene-polydimethylsiloxane diblock copolymer B (PE-PDMS Diblock B) | 47.8 wt % PDMS[1]; 52.2 wt % polyethylene[1]; 1,2-butadiene mole % in the polybutadiene block prior to hydrogenation = 48.5 mol % Mw = 4,780 g/mol; polyethylene block crystallinity = 0% | Prepared as described below |

TABLE 1A-continued

| Material/Description | Properties | Source |
|---|---|---|
| polyethylene-polydimethylsiloxane diblock copolymer C (PE-PDMS Diblock C) | 46.6 wt % PDMS[1]; 53.4 wt % polyethylene[1]; 1,2-butadiene mole % in the polybutadiene block prior to hydrogenation = 29.0 mol % Mw = 4,780 g/mol; polyethylene block crystallinity = 2.3% | Prepared as described below |
| Additive Concentrate A | 2 wt % PE-PDMS Diblock A dispersed in 98 wt % AFFINITY ™ 1880G[2] | Prepared as described below |
| Additive Concentrate B | 2 wt % PE-PDMS Diblock B dispersed in 98 wt % AFFINITY ™ 1880G[2] | Prepared as described below |
| Additive Concentrate C | 2 wt % PE-PDMS Diblock C dispersed in 98 wt % AFFINITY ™ 1880G[2] | Prepared as described below |

[1]Based on the total weight of the respective PE-PDMS diblock copolymer.
[2]Based on the total weight of the respective concentrate.

Polyethylene-Polydimethylsiloxane Diblock Copolymer Synthesis

The polyethylene-polydimethylsiloxane (PE-PDMS) diblock copolymers A, B, and C of Table 1A each is synthesized by forming a polybutadiene-PDMS (PBD-PDMS) diblock copolymer first, and then hydrogenating the polybutadiene-PDMS diblock copolymer to form a PE-PDMS diblock copolymer.

The PBD-PDMS diblock copolymer is made via anionic polymerization. First, a recipe amount of butadiene (BD) and tetrahydrofuran (THF) additive are dissolved in cyclohexane in a 2 liter Zipperclave Hastelloy C pressure reactor and kept at 50° C., air and moisture free. Then, a recipe amount of sec-Butyl lithium (s-BuLi, 1.3M) is shot-added air-free to the reactor. The reactor is heated to 60° C., and then cooled to 25° C. after a certain reaction time to form PBD-Li. Then, a recipe amount of hexamethylcyclotrisiloxane (D3), pre-dissolved in cyclohexane, is shot-added to the reactor and allowed to mix for 5 minutes. Then, a recipe amount of THF solvent is loaded to the reactor, air-free, and the reactor is heated to 50° C. After a certain time, the reaction is cooled and a recipe amount of chlorotrimethylsilane (TMSCl) is added to quench the reaction. The final product mix is concentrated to a viscous residue by rotavap, and then re-dissolved in cyclohexane to make a 15-20 wt % solution. The slurry is then filtered using a 1 micron fiberglass filter to remove LiCl salt. The filtered product solution that contains PBD-PDMS diblock copolymer is stored cold in a refrigerator until further processing. The reagents used in anionic polymerization, including THF, cyclohexane and D3, are pre-treated with alumina to remove any water before usage. The detailed recipes to make PBD-PDMS Diblock A, PBD-PDMS Diblock B, and PBD-PDMS Diblock C are shown in Table 1B.

TABLE 1B

Recipes for PBD-PDMS Diblock Copolymer

| | PBD-PDMS Diblock A | PBD-PDMS Diblock B | PBD-PDMS Diblock C |
|---|---|---|---|
| BD + s-BuLi → PBD-Li | | | |
| tetrahydrofuran (THF) additive (g) | 2.3 | 5.15 | 1.52 |
| Butadiene (BD) (g) | 95.8 | 80.1 | 81.9 |
| sec-Butyl lithium (s-BuLi) (g) | 11.0 | 24.8 | 24.8 |
| Cyclohexane (g) | 513.5 | 464.7 | 467.0 |
| Reaction Time to Form PBD-Li (hr) | 1 | 1 | 1 |

TABLE 1B-continued

Recipes for PBD-PDMS Diblock Copolymer

| | PBD-PDMS Diblock A | PBD-PDMS Diblock B | PBD-PDMS Diblock C |
|---|---|---|---|
| PBD-Li + D3 + TMSCl → PBD-PDMS + LiCl | | | |
| hexamethylcyclotrisiloxane (D3) (g) | 96.1 | 83.6 | 86.3 |
| THF (g) | 522.0 | 500 | 504 |
| Reaction Time to Form PBD-PDMS Diblock Copolymer (hr) | 2 | 1.75 | 1.5 |
| chlorotrimethylsilane (TMSCl) (mL) | 3.5 | 8.0 | 8.0 |

The PBD-PDMS diblock copolymers are hydrogenated to form the final PE-PDMS diblock copolymers. First, the PBD-PDMS diblock copolymer product solution made as described above is loaded to the 2 liter reactor. A recipe amount (Table 1C) of palladium on carbon (Pd/C) catalyst (5% purity), pre-suspended in about 50 mL cyclohexane in glove box, are loaded into the reactor so that the Pd loading is about 0.3 mol % of PBD-PDMS diblock copolymer. The reactor is sealed, pressure tested, and then purged 3 times with 100 psig hydrogen, and pressurized to 450 psig and heated to 60° C. while stirring at 800 rpm. After about 1.5 hours of reaction, the slurry is filtered through 1 micron filter paper in an inert filter crock filled with celite filter aid. The filtrates are stripped down by rotavap to about 15 wt % concentration, and then slowly added to a methanol/isopropanol mixture for purification and isolation. After addition, the mother liquor (methanol/isopropanol phase) is removed, and the heavy phase PE-PDMS diblock copolymer is collected and dried in vacuum oven.

TABLE 1C

Recipes for PE-PDMS Diblock Copolymer

| | PE-PDMS Diblock A | PE-PDMS Diblock B | PE-PDMS Diblock C |
|---|---|---|---|
| palladium on carbon (Pd/C) catalyst (5% purity) (g) | 7.0 | 6.6 | 6.6 |

Additive Concentrates

A PE-PDMS diblock copolymer (PE-PDMS Diblock A, PE-PDMS Diblock B, or PE-PDMS Diblock C, prepared as described above) is melt blended in AFFINITY™ 1880G at 10 wt % loading on a Haake batch mixer. Mixing is performed under nitrogen at 200° C. The resulting melt is flattened by applying pressure, and chopped into pieces. The pieces are cryo-ground into smaller pieces suitable for feeding in an extruder. The cryo-ground pieces are dry blended with pellets of AFFINITY™ 1880G at 20 wt % loading, and the mixture is fed through a 18 mm Leistritz twin screw extruder for melt blending. Melt blending is performed at 200° C. The strand exiting the extruder is chopped to obtain pellets of 2 wt % PE-PDMS diblock copolymer in AFFINITY™ 1880G.

Additive Concentrate A contains 2 wt % PE-PDMS Diblock A. Additive Concentrate B contains 2 wt % PE-PDMS Diblock B. Additive Concentrate C contains 2 wt % PE-PDMS Diblock C.

Coextruded 3-Layer Blown Film

Coextruded 3-layer blown film samples are prepared using the materials of Table 1A using a LabTech 5 layer blown film line. The line is equipped with two 25 mm single screw extruders, three 20 mm single screw extruders, and a 75 mm die. Total film thickness is set to 2 mils (50 μm).

The resulting coextruded 3-layer film samples each has the following Structure (A):

sealant layer/core layer/skin layer            Structure (A).

Each coextruded film sample has a thickness of 50 μm, and the thickness of each layer has a ratio of 1:3:1 (sealant:core:skin).

The sealant layer of Comparative Sample 1 (CS 1) contains 100 wt % AFFINITY™ 1881G. The sealant layer of Comparative Sample 2 (CS 2) contains 93.125 wt % AFFINITY™ 1880G, 4.875 wt % MB25-502, 1.5 wt % MB25-035, and 0.5 wt % ME 50024. The sealant layer of Comparative Sample 3 (CS 3) contains 88.235 wt % AFFINITY™ 1880G, 10 wt % Additive Concentrate A, 1.125 wt % DOWLEX™ 2047G, and 0.64 wt % Talc Concentrate. The sealant layer of Example 4 (Ex 4) contains 88.235 wt % AFFINITY™ 1880G, 10 wt % Additive Concentrate B, 1.125 wt % DOWLEX™ 2047G, and 0.64 wt % Talc Concentrate. The sealant layer of Example 5 (Ex 5) contains 88.235 wt % AFFINITY™ 1880G, 10 wt % Additive Concentrate C, 1.125 wt % DOWLEX™ 2047G, and 0.64 wt % Talc Concentrate.

The blow up ratio is set to 3.0 and a frost line height of 10 inches is maintained. No internal cooling is employed. A 13.9 inch wide and 200 feet long roll of collapsed bubble is made, which is corona-treated on the skin layer side to get surface energy of greater than 42 mN/m. The bubble is slit to make two 12 inch wide rolls. The layer configurations are provided below in Table 2.

Each film sample is tested for Pre-Lamination COF. The results are reported in Table 2.

Laminate

The corona-treated 3-layer blown film samples having the Structure (A) are laminated to a 12 μm (48 mil) thick BOPET film on a Labo Combi™ 400 laminator using MOR-FREE™ L705/C-79 (a solvent-less polyurethane adhesive available from Rohm and Haas), with the L705 and C-79 mixed at a weight ratio of 100:42. Prior to adhesive application, the skin layer side is dosed with 0.6 kW corona to clean the surface. The adhesive is applied using a Gravure roll at a surface density of 1.8 g/m², and subsequently nipped at 60° C. The adhesive is cured at 25° C. and 50% relative humidity for at least 7 days.

The resulting laminates have the following Structure (B):

BOPET film substrate/adhesive layer/skin layer/core layer/sealant layer            Structure (B).

The laminate samples are tested for Laminate 60° C. Aged COF. The results are reported in Table 2. In Table 2, "CS" refers to Comparative Sample.

Results

Comparative Sample 1 (CS 1) is a laminate with an adhesive layer, a BOPET film substrate, and a film with a sealant layer containing (A) an ethylene-based polymer (AFFINITY™ 1881G) and (B) a fatty acid amide (CS 1)—and no PE-PDMS block copolymer. CS 1 exhibits a high Laminate 60° C. Aged COF of greater than 1, a high ΔCOF of greater than 0.680, and a high haze of 5.26%.

Comparative Sample 2 (CS 2) is a laminate with an adhesive layer, a BOPET film substrate, and a film with a sealant layer containing (A) an ethylene-based polymer (AFFINITY™ 1880G) and (B) PDMS—and no PE-PDMS block copolymer. CS 2 exhibits a high ΔCOF of 0.291 and a high haze of 9.49%.

TABLE 2

|  | CS 1 | CS 2 | CS 3 | Ex 4 | Ex 5 |
|---|---|---|---|---|---|
| Sealant Layer[1] | | | | | |
| AFFINITY ™ 1881G (wt %)[2] (contains 0.075 wt % fatty acid amide, 0.25 wt % inorganic antiblock, and 7.175 wt % DOWLEX ™ Carrier Resin) | 100 | — | — | — | — |
| AFFINITY ™ 1880G (wt %)[2] | — | 93.125 | 98.025 | 98.025 | 98.025 |
| PDMS (wt %)[2] (from MB25-502 Masterbatch) | — | 1.125 | — | — | — |
| PDMS (wt %)[2] (from MB25-035 Masterbatch) | — | 0.375 | — | — | — |
| PE-PDMS Diblock A (wt %)[2] (from Additive Concentrate A) | — | — | 0.02 | — | — |
| PE-PDMS Diblock B (wt %)[2] (from Additive Concentrate B) | — | — | — | 0.02 | — |
| PE-PDMS Diblock C (wt %)[2] (from Additive Concentrate C) | — | — | — | — | 0.02 |
| Talc (wt %)[2] (from Talc Concentrate) | — | — | 0.320 | 0.320 | 0.320 |
| Talc (wt %)[2] (from ME 50024 Masterbatch) | — | 0.320 | — | — | — |
| DOWLEX ™ 2047G (wt %)[2] (from Talc Concentrate) | — | — | 1.125 | 1.125 | 1.125 |
| LDPE A (wt %)[2] (from MB25-502 Masterbatch) | — | 3.75 | — | — | — |
| LDPE B (wt %)[2] (from MB25-035 Masterbatch) | — | 1.125 | — | — | — |
| LDPE C (wt %)[2] (from ME 50024 Masterbatch) | — | 0.18 | — | — | — |
| Core Layer[1] | | | | | |
| DOWLEX ™ 2045G (wt %)[3] | 80 | 80 | 80 | 80 | 80 |
| AGILITY ™ 1001 (wt %)[3] | 20 | 20 | 20 | 20 | 20 |

TABLE 2-continued

|  | CS 1 | CS 2 | CS 3 | Ex 4 | Ex 5 |
|---|---|---|---|---|---|
| Skin Layer[1] |  |  |  |  |  |
| DOWLEX ™ 2045G (wt %)[4] | 80 | 80 | 80 | 80 | 80 |
| AGILITY ™ 1001 (wt %)[4] | 20 | 20 | 20 | 20 | 20 |
| Adhesive Layer |  |  |  |  |  |
| MOR-FREE ™ 705/C-79 (wt %)[5] | 100 | 100 | 100 | 100 | 100 |
| BOPET Film Substrate[6] |  |  |  |  |  |
| Biaxially Oriented PET (wt %)[7] | 100 | 100 | 100 | 100 | 100 |
| Properties: |  |  |  |  |  |
| Pre-Lamination COF | 0.32 | 0.258 | 0.362 | 0.438 | 0.443 |
| Laminate 60° C. Aged COF | >1 | 0.549 | 0.812 | 0.571 | 0.624 |
| ΔCOF[8] | >0.680 | 0.291 | 0.450 | 0.133 | 0.181 |
| Haze (%) | 5.26 | 9.49 | 4.14 | 4.47 | 4.47 |
| HSIT (° C.) | 80 | 90 | 80 | 80 | 80 |

[1]The sealant layer, core layer, and skin layer each is formed from the 3-layer blown film described above.
CS = Comparative Sample
[2]Based on the total weight of the sealant layer.
[3]Based on the total weight of the core layer.
[4]Based on the total weight of the skin layer.
[5]The adhesive layer has a dried coat weight of 1.8 g/m². Weight percent is based on the total weight of the adhesive layer.
[6]The BOPET film substrate has a thickness of 12 μm.
[7]Based on the total weight of the BOPET film substrate.
[8]ΔCOF = (Laminate 60° C. Aged COF) − Pre-Lamination COF Comparative Sample 3 (CS 3) is a laminate with an adhesive layer, a BOPET film substrate, and a film with a sealant layer containing (A) an ethylene-based polymer (AFFINITY™ 1880G) and (B) PE-PDMS block copolymer having a Mw greater than 10,000 g/mol (PE-PDMS Diblock A having a Mw of 12,950 g/mol). CS 3 exhibits a high Laminate 60° C. Aged COF of 0.812 and a high ΔCOF of 0.450.

Applicant surprisingly found that laminates with an adhesive layer, a BOPET film substrate, and a film with a sealant layer containing (A) an ethylene-based polymer (AFFINITY™ 1880G) and (B) a PE-PDMS block copolymer having a Mw from 1,000 g/mol to 10,000 g/mol (Ex. 4, containing PE-PDMS Diblock B having a Mw of 4,780 g/mol; and Ex. 5, containing PE-PDMS Diblock C having a Mw of 4,780 g/mol) advantageously exhibit a Laminate 60° C. Aged COF of less than 0.80, a ΔCOF of less than 0.20, a haze of 4.47%, and a HSIT of 80° C.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A laminate comprising:
a film comprising a sealant layer comprising:
(A) a first ethylene-based polymer having a density from 0.900 g/cc to 0.925 g/cc and a melt index from 0.5 g/10 min to 30 g/10 min;
(B) a polyethylene-polydimethylsiloxane block copolymer comprising (i) at least one polyethylene block formed from hydrogenating at least one polybutadiene block comprising 1,2-butadiene, the at least one polyethylene block having a crystallinity from 0% to 5% and (ii) at least one polydimethylsiloxane block, the polyethylene-polydimethylsiloxane block copolymer having a weight average molecular weight from 1,000 g/mol to 10,000 g/mol;
a substrate; and
an adhesive layer adhering the film to the substrate;
wherein crystallinity is calculated in accordance with Equation (1), where x is the mole % of 1,2-butadiene in the at least one polybutadiene block prior to hydrogenation, as measured by proton Nuclear Magnetic Resonance Spectroscopy ($^1$H NMR):

Equation (1)

$$\text{Crystallinity (wt \%)} = \begin{cases} 0.0136x^2 - 2.436x + 61.475, & \text{if } x < 30.39 \\ 0, & \text{if } x \geq 30.39 \end{cases}.$$

2. The laminate of claim 1, wherein the polyethylene-polydimethylsiloxane block copolymer comprises from 40 wt % to 55 wt % of the at least one polyethylene block and from 60 wt % to 45 wt % of the at least one polydimethylsiloxane block, based on the total weight of the polyethylene-polydimethylsiloxane block copolymer.

3. The laminate of claim 2, wherein the sealant layer comprises from 0.01 wt % to 2.0 wt % polyethylene-polydimethylsiloxane block copolymer, based on the total weight of the sealant layer.

4. The laminate of claim 3, wherein the film is a multilayer film and comprises a core layer and a skin layer, wherein the core layer is between the skin layer and the sealant layer; and
the skin layer is in contact with the adhesive layer.

5. The laminate of claim 4 wherein the sealant layer has a laminate 60° C. Aged coefficient of friction (COF) from 0.01 to 0.8 as measured in accordance with ASTM D1894 after the adhesive layer of the laminate is cured for seven days at 25° C. and then the laminate is heated for seven days at 60° C.

6. The laminate of claim 5, wherein the sealant layer has a a haze of from 0% to 5%.

7. The laminate of claim 6 wherein, prior to the film being combined with the substrate and the adhesive layer, the sealant layer has a pre-lamination coefficient of friction (COF) from 0.01 to 0.45, wherein the film is produced as a film roll and the pre-lamination COF is measured in accordance with ASTM D1894 after the film roll is stored for one week at 25° C.

8. The laminate of claim 1 wherein the 1,2-butadiene is present in a polybutadiene block prior to hydrogenation in an amount from 29.0 mol % to 48.5 mol %.

9. The laminate of claim 1 wherein the adhesive layer comprises an adhesive composition selected from the group consisting of polyurethane adhesive, polyacrylate adhesive, and combinations thereof.

10. The laminate of claim 9 wherein the adhesive layer has a dry coating weight from 0.5 g/m$^2$ to 3.0 g/m$^2$.

11. The laminate of claim 1, wherein the substrate comprises a component selected from the group consisting of a second ethylene-based polymer, a propylene-based polymer, polyamide, polyester, ethylene vinyl alcohol copolymer, polyethylene terephthalate, ethylene vinyl acrylate copolymer, ethylene methyl acrylate copolymer, ethylene ethyl acrylate copolymer, ethylene butyl acrylate copolymer, ethylene acrylic acid copolymer, ethylene methacrylic acid copolymer, an ionomer of ethylene acrylic acid, an ionomer of methacrylic acid, maleic anhydride grafted ethylene-based polymer, a metal foil, and combinations thereof.

* * * * *